INVENTORS S. DARLINGTON
I. W. SANDBERG
BY R. O. Nimtz
ATTORNEY

SYNTHESIS OF TWO-PORT NETWORKS HAVING PERIODICALLY TIME-VARYING ELEMENTS

Filed May 16, 1962 3 Sheets-Sheet 2

INVENTORS S. DARLINGTON
I. W. SANDBERG
BY R. O. Nimtz
ATTORNEY

Aug. 9, 1966 S. DARLINGTON ETAL 3,265,973
SYNTHESIS OF TWO-PORT NETWORKS HAVING PERIODICALLY
TIME-VARYING ELEMENTS
Filed May 16, 1962 3 Sheets-Sheet 3

INVENTORS S. DARLINGTON
I. W. SANDBERG
BY R. O. Nimz
ATTORNEY 3,265,973
Patented August 9, 1966

3,265,973

SYNTHESIS OF TWO-PORT NETWORKS HAVING PERIODICALLY TIME-VARYING ELEMENTS

Sidney Darlington, Passaic Township, Morris County, and Irwin W. Sandberg, Springfield, N.J., assignors to Bell Telephone Laboratories, Incorporated, New York, N.Y., a corporation of New York Filed May 16, 1962, Ser. No. 195,200
13 Claims. (Cl. 328—14)

This invention relates to time-varying networks and, more particularly, to the synthesis of two-port networks having periodically time-varying elements.

Canonical network forms have heretofore been available for constructing networks having time-invariant elements. The so-called "Foster forms" are one example of canonical network forms for time-invariant two-terminal LC, RC, and RL networks. These basic "Foster forms" are fully discussed and analyzed in the text "Synthesis of Passive Networks," by E. A. Guillemin, Wiley and Sons, 1957. Canonical forms for periodically time-varying networks have not heretofore been available, however, and hence the ability of the circuit designer to utilize this type of network has been severely restricted.

It is an object of the present invention to provide a network form having universal application to certain broad classes of linear varying parameter systems.

It is a more specific object of the invention to synthesize two-port structures which exhibit time-varying properties of the periodically variable type.

In accordance with the present invention, linear time-varying element systems are realized by a canonical network form including a plurality of parallel branches or sections of three different types. A first type, which will be termed the zeroth order section, comprises a simple controlled source with a periodically variable controlled source coefficient. In this specification, a controlled source coefficient means simply a circuit arrangement in which the input is multiplied by the source coefficient, in this case, a time variable coefficient.

A second type of branch, termed the first order section, includes a simple time-invariant network having a controlled source supplying its input and a controlled source to which its output is applied. A subplurality of first order sections is provided.

The third type of branch, termed a second order section, comprises a bridge or lattice arrangement of four simple time-invariant networks having controlled sources connected to each vertex of the bridge or lattice. The input is supplied to two of the controlled sources connected to an opposite pair of vertices of the bridge and outputs are taken from the remaining two controlled sources connected to the remaining pair of vertices and combined to form the output of that branch.

The complete canonical network is formed by connecting all of the branches, the zeroth, first and second order sections, in parallel, between the input port and the output port.

Time varying networks of the present invention are useful for realizing transfer properties which vary periodically with time. Thus the circuits of the present invention are useful for frequency swept oscillators, variable pass-band amplifiers or periodically varying equalizers. Both variable amplitude characteristics and variable phase characteristics can be provided with the circuits of the present invention.

Furthermore, certain physical systems are inherently characterized by parameters which vary periodically with time. A parametric amplifier, for example, includes a non-linear capacitor whose value varies periodically with the periodic variations of an applied voltage. Networks of the present invention can be synthesized to simulate the operation of such physical systems and are useful in this way for the study and design of such physical systems.

The major advantage of networks of the present invention is their generality, which renders them useful for synthesizing a very large class of time-varying characteristics.

These and other objects and features, the nature of the present invention and its various advantages, can be more readily understood upon consideration of the attached drawings and of the following detailed description of the drawings.

A broad class of linear varying-parameter systems with an input $x(t)$ and an output $y(t)$ are characterized by a particular type of differential equation. This equation can be written in the general form $$A_t y = B_t x \qquad (1)$$

where $$A_t = \sum_{n=0}^{N} a_n(t) \frac{d^n}{dt^n}(\ \ )$$

$$B_t = \sum_{m=0}^{M} b_m(t) \frac{d^m}{dt^m}(\ \ )$$

and $$M \leqq N.$$

In accordance with the present invention, structures can be synthesized which realize Equation 1 for the important special case in which the coefficients $a_n(t)$ and $b_m(t)$ are periodic functions of $t$ with a period T. The realization of structures with these properties employs controlled sources with periodically variable controlled source coefficients and very simple time-invariant networks.

The solution of Equation 1 which is subject to the boundary conditions $$\left.\frac{d^l}{dt^l}(y)\right|_{t=} = 0,\ l = 0, 1, \ldots (N-1)$$

and $$\left.\frac{d^q}{dt^q}(x)\right|_{t=} = 0,\ q = 0, 1, \ldots (M-1)$$

can be expressed, as outlined by K. S. Miller in "Properties of Impulsive Responses and Green's Functions," IRE Transactions on Circuit Theory, volume CT-2, Number 1, pages 26-31, March 1955, as $$y(t) = \frac{b_N(t)}{a_N(t)} x(t) + \int_0^t [B_z^a K(t, z)] x(z) dz \qquad (2)$$

where $B_z^a$ is the operator adjoint to $B_t$ with $t$ replaced with $z$, and $$K(t, z) = \frac{(-1)^{(N-1)}}{a_N(z) W(z)} \begin{vmatrix} \Phi_1(t) & \Phi_2(t) & \cdots & \Phi_N(t) \\ \Phi_1(z) & \Phi_2(z) & \cdots & \Phi_N(z) \\ \Phi_1^{(1)}(z) & \Phi_2^{(1)}(z) & \cdots & \Phi_N^{(1)}(z) \\ \vdots & \vdots & & \vdots \\ \Phi_1^{(N-2)}(z) & \Phi_2^{(N-2)}(z) & \cdots & \Phi_N^{(N-2)}(z) \end{vmatrix}$$

The $\Phi_n(z)$ are a set of N linearly independent solutions, sometimes referred to as basis functions, of the equation $A_z y=0$, and $W(z)$ is the corresponding Wronskian function.

It will be noted that Equation 2 is of the form $$y(t)=\frac{b_N(t)}{a_N(t)}x(t)+\int_0^t\left[\sum_{n=1}^{N}\Phi_n(t)\Psi_n(z)\right]x(z)dz \quad (3)$$

and will be analyzed as such hereafter.

Figure 1:
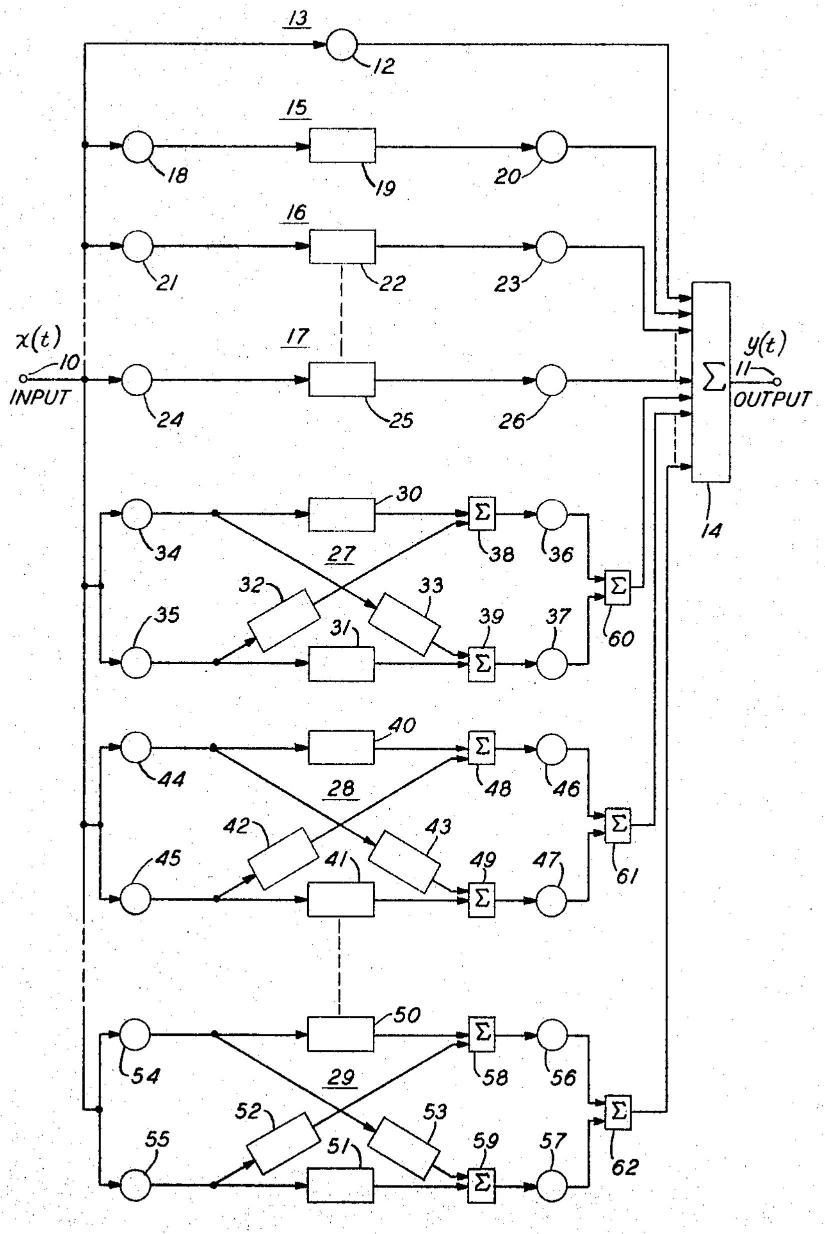
FIG. 1 is a schematic block diagram of the canonical form for time-varying networks in accordance with the present invention.

In order to derive the canonical form given in FIG. 1, it is necessary to consider a very special choice of the basis functions $\Phi_n(t)$. This choice requires slightly more than the usual Floquet theory. Let the components of an N-vector $V(t)$ be a linearly independent set of real solutions of $A_t(y)=0$. Because of the periodicity of the coefficients of the operator $A_t$, the components of $V(t+T)$ also form a basis and therefore there exists a constant real nonsingular N x N matrix C such that $$V(t+T)=CV(t) \quad (4)$$

In the event that C is similar to a diagonal matrix, which is always the case when the characteristic roots of A are distinct, Equation 4 can be rewritten as $$DV(t+T)=[DCD^{-1}]DV(t)$$
$$=\text{diag }[c_1, c_2, \ldots c_N]\ DV(t) \quad (5)$$

where $$c_n\neq 0$$

when $n=1, 2, \ldots$ N, where D is a nonsingular and, in general, complex constant matrix, and the $c_n$ are the characteristic roots of C. The elements of $DV(t)$ also form a basis and the $n$th element of this vector, $\Phi_n(t)$ can be written in accordance with the usual Floquet theory as $$\Phi_n(t)=e^{-\sigma_n't}f_n'(t) \quad (6)$$

where $$e^{-\sigma_n'T}=c_n$$

and $f'_n(t)$ is periodic with period T. Assuming that, in the formulation of D, the characteristic vector of C associated with a complex $c_n$ is chosen to be the conjugate of the characteristic vector associated with the conjugate root, then it follows that $\Phi_n(t)$ is real if $c_n$ is real and that the $\Phi_n(t)$ corresponding to complex conjugate values of the $c_n$ are complex conjugate functions. Furthermore, for each real $c_n$ such that $c_n<0$, there is obtained a real basis function of the form $$\Phi_n(t)=e^{-\left(\alpha+j\frac{\pi}{T}\right)t}f_n'(t) \quad (7)$$

where $\alpha$ is real and $f'_n(t)$ is periodic with period T. This function can therefore be rewritten in the form $$\Phi_n(t)=e^{-\alpha_n t}f_n(t)$$

where $f_n(t)$ is a real periodic function with period 2T. In order to proceed, it will be assumed that the set of basis functions $[\Phi_n(t)]$ is chosen in accordance with this discussion such that each member is of the form $$\Phi_n(t)=e^{-\sigma_n t}f_n(t) \quad (8)$$

with $f_n(t)$ periodic with period 2T and such that, if $$\Phi_j(t)=e^{-\sigma_j t}f_j(t)$$

is in the set and $\sigma_j$ is complex, then the conjugate of $\Phi_j$ is a second member of the set. It is, of course, true that some of the $f_n(t)$ may have a period T.

Returning to Equation 3, it can be seen from Equations 2 and 8 and the expression for $K(t,z)$ that $$\Psi_n(z)=e^{\sigma_n z}g_n(z) \quad (9)$$

where $g_n(z)$ is periodic with period 2T.

Utilizing Equations 8 and 9, Equation 3 can be rewritten in the form $$y(t)=\frac{b_N(t)}{a_N(t)}x(t)+\sum_{n=1}^{N}\int_0^t f_n(t)e^{-\sigma_n(t-z)}g_n(z)x(z)dz \quad (10)$$

It can be assumed that $\sigma_n=\alpha_n+j\beta_N$ with $\alpha_n\geqq 0$, and that the $\beta_N$ vanish if, and only if, $n=1,2, \ldots (N-2P)$. It will be noted that there is some freedom in the choice of $|\beta_n|$ which can always be chosen to satisfy the relation $$|\beta_n|\leq\frac{\pi}{T}$$

By pairing complex conjugate terms in the sum in Equation 10, with the $\Phi_j$ ordered such that $\Phi_{N-2P+K}=\Phi^*_{N-P+K}$ $(k=1,2 \ldots P)$, there is obtained $$y(t)=\frac{b_N(t)}{a_N(t)}x(t)$$
$$+\sum_{n=1}^{N-2P}\int_0^t f_n(t)e^{-\sigma_n(t-z)}g_n(z)x(z)dz$$
$$+2\sum_{n=N-2P+1}^{N-P}\int_0^t e^{-\alpha_n(t-z)}\{[f_{1,n}(t)g_{1,n}(z)$$
$$-f_{2,n}(t)g_{2,n}(z)]\cos\beta_n(t-z)+[f_{1,n}(t)g_{2,n}(z)$$
$$+f_{2,n}(t)g_{1,n}(z)]\sin\beta_n(t-z)\}x(z)dz \quad (11)$$

where $$f_{1,n}(t)=Re[f_n(t)]$$
$$f_{2,n}(t)=Im[f_n(t)]$$
$$g_{1,n}(z)=Re[g_n(z)]$$

and $$g_{2,n}(z)=Im[g_n(z)] \quad (12)$$

where R$e$ indicates the real part of the corresponding function and I$m$ indicates the imaginary part of the corresponding function.

The realization of a canonical network for linear-parameter systems with periodically varying parameters reduces to the general realization of Equation 11. It can be seen that Equation 11 includes terms of three different types. The realization will therefore include three basically different types of subnetworks to correspond to these three types.

Referring now to FIG. 1, there is shown a schematic block diagram of a canonical network form for time varying systems with periodic ransfer properties in accordance with the present invention. The network of FIG. 1 comprises a plurality of branches connected in parallel between input port 10 and output port 11. This plurality of branches is divided into three basic types which correspond, respectively, to the three types of terms in Equation 11.

The first term on the right-hand side of Equation 11 is a ratio of two periodic functions with the same period, i.e., $a_N(t)/b_N(t)$. This term is realized by a simple controlled source 12, represented schematically as a circle, in branch 13. Source 12 serves to multiply the input function $x(t)$ by the source coefficient $a_N(t)/b_N(t)$ and deliver the product to one input of a summing circuit 14.

The second term on the right-hand side of Equation 11 is a sum of $(N-2P)$ terms from 1 to $(N-2P)$, corresponding to the $\sigma_j$ having vanishing imaginary parts. These terms are realized by means of $(N-2P)$ branch circuits 15, 16 . . . 17. Each of branches 15, 16 . . . 17 comprises an input controlled source and an output controlled source connected together by a simple lumped constant circuit. Thus branch 15 comprises an input controlled source 18 having a source coefficient $g_1(t)$, a time-invariant network 19 characterized by the impulse response $$e^{-\alpha_1 t}$$

and an output controlled source 20 having a source coefficient $f_1(t)$. Similarly, branch 16 comprises an input controlled source 21, a time-invariant network 22 and an output controlled source 23; and branch 17 comprises an input controlled source 24, a time-invariant network 25 and an output controlled source 26.

The third and last term in the right-hand side of Equation 11 is a sum of P terms from $(N-2P+1)$ to $(N-P)$ representing the P pairs of conjugate $\sigma_j$ having non-zero imaginary parts. These terms are realized by means of P branch circuits 27, 28 . . . 29. Each of branches 27, 28 . . . 29 comprises a lattice of four simple lumped constant circuits, an input controlled source in each input arm of the lattice, and an output controlled source in each output arm of the lattice. Thus branch 27 comprises four time-invariant networks 30, 31, 32 and 33, two input controlled sources 34 and 35, and two output controlled sources 36 and 37. Time-invariant circuits 30 and 31 are in the series arms of the lattice and are characterized by the same impulse response, i.e., $$2e^{-\alpha_{(N-2P+1)}t} \sin \beta_{(N-2P+1)}t$$

Time-invariant circuits 32 and 33 are in the shunt arms of the lattice and are also characterized by the same impulse response, $$2e^{-\alpha_{(N-2P+1)}t} \cos \beta_{(N-2P+1)}t$$

but of opposite sign, circuit 32 producing a negative sign.

Input controlled source 34 is connected to the junction of circuits 30 and 33 and has a source coefficient given by $g_{1,(N-2P+1)}(t)$. Input controlled source 35 is connected to the junction of circuits 31 and 32 and has a source coefficient given by $g_{2,(N-2P+1)}(t)$. Output controlled source 36 is connected to the output of summing circuit 38, which combines the outputs of circuits 30 and 32, and has a source coefficient given by $f_{2,(N-2P+1)}(t)$. Output controlled source 37 is connected to the output of summing circuit 39, which combines the outputs of circuits 31 and 33, and has a source coefficient given by $f_{1,(N-2P+1)}(t)$.

Similarly, branch 28 comprises a lattice of four passive circuits 40, 41, 42 and 43, two input controlled sources 44 and 45, and two output controlled sources 46 and 47 connected to the outputs of summing circuits 48 and 49, respectively. Branch 29 likewise comprises a lattice of four passive circuits 50, 51, 52 and 53, two input controlled sources 54 and 55, and two output controlled sources 56 and 57 connected to the outputs of summing circuits 58 and 59, respectively.

The outputs of output controlled sources 36 and 37 are applied to a summing circuit 60; the outputs of output controlled sources 46 and 47 are applied to a summing circuit 61; and the outputs of output controlled sources 56 and 57 are applied to a summing circuit 62.

The input signal $x(t)$ is applied to each of branches 13, 15 through 17 and 27 through 29. The outputs of all of these branching circuits are applied to summing circuit 14, the output of which comprises the output of the over-all network $y(t)$.

It can be seen that by connecting the plurality of branches of FIG. 1 in parallel between input port 10 and output port 11, a circuit configuration is obtained for realizing any periodically varying transfer properties characterized by Equation 1 between ports 10 and 11. Moreover, these properties are obtained with very simple circuit arrangements of controlled sources, simple passive networks and summing circuits.

The summing circuits 14, 38, 39, 48, 49, 58, 59, 60, 61 and 62 in FIG. 1 are provided to isolate the various circuits connected to their inputs and to perform the required addition of time functions. Of course, if the impedance levels at the outputs of these circuits makes such isolation unnecessary, then the summing circuits can be realized with simple resistor networks.

Figure 3:
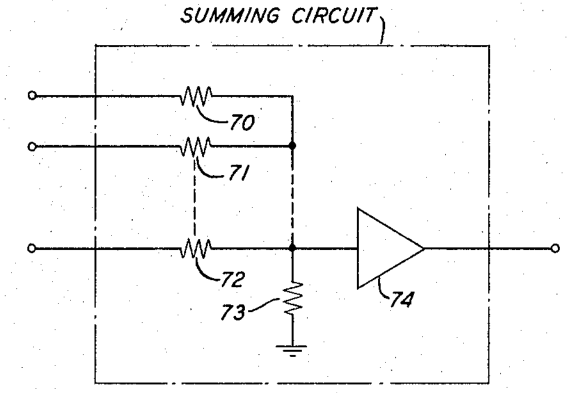
FIG. 3 is a circuit diagram of one type of summing network useful in the network of FIG. 1.

In FIG. 3 there is shown one example of one type of summing circuit suitable for use in FIG. 1. It comprises a plurality of input resistors 70, 71 . . . 72, corresponding in number to the number of inputs to be summed, and a common load resistor 73, and, if necessary to provide the necessary amplitude level, an amplifier 74. The values of resistors 70, 71 . . . 72, of course, are sufficiently high to provide the desired isolation. This type of circuit arrangement is well known in the art and will not be further described here.

Figure 2:
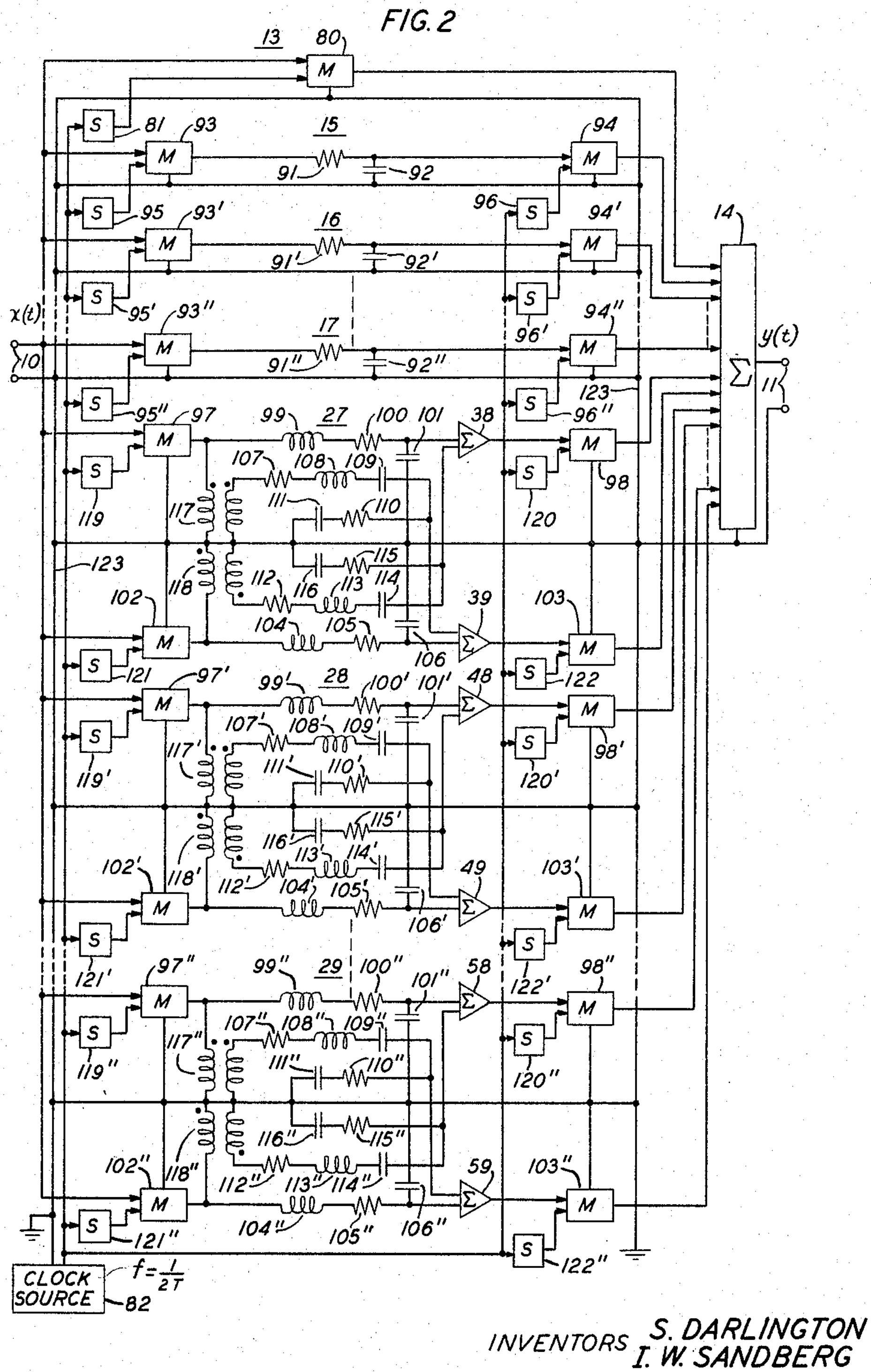
FIG. 2 is a circuit diagram of one realization of the network of FIG. 1 in which simple circuits are used for the required lumped constant time-invariant networks.

In order to better illustrate the simplicity of the circuits of the present invention, a specific embodiment of a two-port network having general periodic transfer properties is illustrated in FIG. 2. The network of FIG. 2 is arranged for unbalanced signals and hence employs a common ground throughout. In addition, the simplest circuit configurations are presented for realizing the passive circuits with the given impulse responses.

Referring then to FIG. 2, like elements have been identified by the same reference numerals in FIG. 1. The unbalanced four-terminal network having periodically varying transfer properties shown in FIG. 2 comprises a pair of input terminals 10 and a pair of output terminals 11 between which are connected in parallel a plurality of branch subnetworks 13, 15 through 17 and 27 through 29. These branch circuits are divided into three different types.

The first type, which includes only one branch 13, comprises a controlled source including a simple analog multiplier circuit 80 which multiplies the two signals supplied to its input terminals and provides the product at its output terminal. One input is the input signal $x(t)$ applied to input terminals 10. The other input is a periodically varying signal derived from a shaping circuit 81 which is driven from a common clock source 82. The source 82 provides periodically varying signals at a frequency ½T, i.e., one-half the basic frequency of the desired variations in transfer properties between terminals 10 and 11.

Circuit 81 utilizes the signals from source 82 to derive the function $b_N(t)/a_N(t)$ as specified in Equation 11. It will be noted that $b_N(t)/a_N(t)$ is a periodic function which is unrestricted except for its period 2T. Circuit 81 therefore serves to shape signals from source 82 to provide the wave shape, amplitude and timing required by the expression $b_N(t)/a_N(t)$. The actual shape of the signals provided by source 82, and the actual circuit arrangements required to generate $b_N(t)/a_N(t)$ therefrom, will depend directly on the expression for $b_N(t)/a_N(t)$. Since wave-shaping techniques are well known in the art, further illustrations will not be provided.

Figure 4:
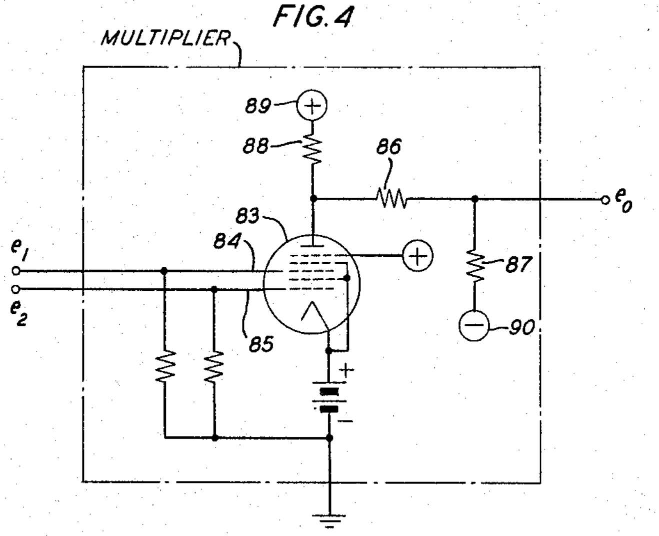
FIG. 4 is a circuit diagram of one type of controlled source having a periodically variable controlled source coefficient useful in the network of FIG. 1.

In FIG. 4 there is shown one example of an analog multiplier circuit which could be used for multiplier 80 in FIG. 2. The multiplier, or product modulator as it is sometimes called, of FIG. 4 comprises a pentagrid tube 83 having two control grids 84 and 85. Within a limited range of operation, set by the various biasing arrangements illustrated, the output voltage $e_0$ of the pentagrid tube is proportional to the product of the input voltage $e_1$ to grid 84 and the input voltage $e_2$ to grid 85. It will be noted that the multiplier of FIG. 4 comprises a high gain amplifier and hence may be used to implement a wide range of constant multipliers of $b_N(t)/a_N(t)$. Similarly, the output circuit includes a voltage divider comprising resistors 86 and 87 which may be adjusted in value to further aid in implementing any constant multiplier of $b_N(t)/a_N(t)$, greater than, less than or equal to one. Finally, the average direct current level of the output voltage $e_0$ can be adjusted to any desired value by adjusting the value of voltage source 90.

Returning to FIG. 2, the second type of branch, which realizes the second term on the right-hand side of Equation 11, is exemplified by branches 15, 16 . . . 17. Since branches 15 through 17 are all essentially of the same form, differing only in the values of the components, only branch 15 will be described in detail.

Branch 15 comprises a simple passive network including a series resistor 91 and a shunt capacitor 92 connected between an input multiplier 93 and an output multiplier 94. Multipliers 93 and 94 are of the same type as multiplier 80 and are driven at one input by shaping circuits 95 and 96 which perform the same function as circuit 81 provides in branch 13. It will be noted that circuits 95 and 96 are driven by the same common clock source 82 and hence provide signals having the same frequency. It is important to note, however, that the shape, amplitude and timing of the output signals from circuits 81, 95, and 96 need not be the same, but can in fact have any values specified by the corresponding $f(t)$ and $g(t)$ functions in Equation 11. Of course, if these values are the same for any two or more of the terms in Equation 11, common shaping circuits can be used to drive all of the corresponding multipliers.

The passive network of branch 15 is characterized in Equation 11 by an impulse response of the form e $$e^{-\alpha_n t}$$

Any constant multiplier of this term can be assumed in the $f(t)$ or $g(t)$ expressions as described above. Well-known network synthesis techniques can be used to obtain the values of resistor 91 and capacitor 92 from the value of $\alpha_n$.

The third type of branch, which realizes the third term on the right-hand side of Equation 11, is exemplified by branches 27, 28 . . . 29. Since branches 27 through 29 are all essentially alike in form, differing only in the values of the components, only branch 27 will be described in detail.

Branch 27 comprises a lattice network of four simple passive circuits. The first passive circuit, connected between an input multiplier 97 and summing circuit 38, comprises a series inductor 99, a series resistor 100 and a shunt capacitor 101. This passive circuit is characterized in Equation 11 by an impulse response of the form $$2e^{-\alpha_n t} \sin \beta_n t_x$$

and is represented in FIG. 1 by circuit 30. The actual values of the components 99, 100 and 101 can be easily computed by well-known techniques from the values of $\alpha_n$ and $\beta_n$.

A second simple passive circuit is connected between input multiplier 102 and summing circuit 39 and comprises a series inductor 104, a series resistor 105 and a shunt capacitor 106. This passive circuit is also characterized in Equation 11 by an impulse response of the form $$2e^{-\alpha_n t} \sin \beta_n t$$

and is represented in FIG. 1 by circuit 31. It will be noted that the two circuits, one comprising elements 99, 100 and 101, and the other comprising elements 104, 105 and 106, are both characterized by the same impulse response. These circuits are therefore alike not only in form, but the values of the components will be the same.

A third simple passive circuit is connected between input multiplier 97 and summing circuit 39, forming one cross-arm of the lattice. This circuit comprises a series resistor 107, a series inductor 108, a series capacitor 109, and a shunt arm comprising the series combination of resistor 110 and capacitor 111. This passive circuit is characterized in Equation 11 by an impulse response of the form $$2e^{-\alpha_n t} \cos \beta_n t$$

and is represented in FIG. 1 by circuit 33. The actual values of the components 107 through 111 can be easily computed by well-known techniques from the values of $\alpha_n$ and $\beta_n$. The factor of "2" can be realized by a proper design of the multipliers, or by a transformer 117 with the proper turns ratio connected in the input.

The fourth and last simple passive network is connected between input multiplier 102 and summing circuit 38 and forms the other cross-arm of the lattice. This circuit comprises a series resistor 112, a series inductor 113, a series capacitor 114, and a shunt arm comprising the series combination of resistor 115 and capacitor 116. This passive circuit is also characterized in Equation 11 by an impulse response of the form $$-2e^{-\alpha_n t} \cos \beta_n t$$

and is represented in FIG. 1 by circuit 32. It will be noted that the two circuits, one comprising elements 107 through 111, and the other comprising elements 112 through 116, are both characterized by the same impulse response, except for their signs. These circuits are therefore alike not only in form, but also the values of the components are alike. The difference in signs as well as the factor "2" can be realized by a transformer 118 with the proper turns ratio and the sense of one of the windings reversed as compared to transformer 117. The output of summing circuit 38 is applied to output multiplier 98 while the output of summing circuit 39 is applied to output multiplier 103.

One input to each of multipliers 97, 98, 102, and 103 is derived from a corresponding one of shaping circuits 119, 120, 121 and 122, which are similar to shaping circuits 81, 95 and 96. The other input to multipliers 97 and 102 is the input signal $x(t)$. The other input to multipliers 98 and 103 is the output of the summing circiuts 38 and 39. The outputs of all of multipliers 80, 94, 98 and 103 are summed by summing circuit 14 to produce at terminals 11 the output signal $y(t)$.

It will be noted that all of the circuits of FIG. 2 are unbalanced to ground and hence all have a common ground at ground bus 123. Input signals at terminals 10 and output signals at terminals 11 also share this common ground. Useful circuits can also be designed without a common ground by means of balanced circuits throughout. Such balanced circuits, however, are more difficult to construct and hence are used only when absolutely necessary.

In accordance with the present invention, the networks of FIGS. 1 and 2 provide generalized two-port (four terminal) realization of periodically varying transfer properties are represented by equations of the form of Equation 1. It is required only that the varying properties have a fixed period T. Having realized such variable networks, it is clear that they can be combined in series, parallel or other more complex arrangements to realize other desirable transfer properties.

It is to be understood that the above-described arrangements are merely illustrative of numerous and varied other arrangements which may constitute applications of the principles of the invention. Such other arrangements may readily be devised by those skilled in the art without departing from the spirit or scope of the invention.

What is claimed is:

1. A time-varying network comprising a plurality of branch circuits connected in parallel, said branch circuits including circuits of three different kinds; a first kind of branch circuit comprising a product modulator having one periodically varying input; a second kind of branch circuit comprising a time-invariant two-port linear transducer, an input product modulator and an output product modulator, said transducer being connected in series between said input product modulator and said output product modulator, said input and output product modulators each having one periodically varying input; and a third kind of branch circuit comprising a lattice network of passive two-port linear transducers including series arms and shunt arms, a pair of input product modulators connected to the input side of said lattice network and a pair of output product modulators connected to the output side of said lattice network, said input and output product modulators each having one periodically varying input.

2. In combination, a first branching network comprising a multiplying circuit, a plurality of second branching networks, each of said second branching networks comprising a linear time-invariant circuit, an input multiplying circuit and an output multiplying circuit connected in series, a plurality of third branching networks, each of said third branching networks comprising a bridge of linear passive circuits, a pair of input multiplying circuits connected to one pair of opposite vertices of said bridge, and a pair of output multiplying circuits connected to the other pair of opposite vertices of said bridge, and means connecting all of said branching networks in parallel between input and output terminals.

3. The combination according to claim 2 further including a source of control signals having a fixed period, and means for deriving multiplying signals from said control signals and applying said multiplying signals to one input of each of said multiplying circuits.

4. The combination according to claim 2 wherein each of said branching networks is unbalanced to a common ground level.

5. The combination according to claim 4 wherein said linear time-invariant circuits in said second branching networks each include a series arm and a shunt arm, said series arm comprising a resistive element and said shunt arm comprising a capacitive element.

6. The combination according to claim 4 wherein said linear passive circuits in said third branching networks each comprise a first pair of linear circuits each including a series arm and a shunt arm, said series arms of said first pair each including an inductive element and a resistive element connected in series, said shunt arms of said first pair each comprising a capacitive element, and a second pair of linear circuits each also including a series arm and a shunt arm, said series arm of said second pair each including a resistive element, an inductive and a capacitive element connected in series, said shunt arms of said second pair each including a resistive element and a capacitive element connected in series.

7. The combination according to claim 6 wherein said second pair of linear circuits each include a transformer having a turns ratio of two to one, the secondary windings of said transformers being connected in opposite senses with respect to each other.

8. A periodically varying two-port network comprising a plurality of input modulators and a plurality of output modulators, a first subplurality of two-port linear transducers each connected between one input modulator and a corresponding one output modulator, a second subplurality of lattice networks of two-port, linear transducers each connected between one pair of input modulators and a corresponding one pair of output modulators, an input port, means for connecting one input of all of said input modulators to said input port, an output port, and means for connecting the outputs of all of said output modulators to said output port.

9. The periodically varying two-port network according to claim 8 further including a source of periodically varying signals of fixed period, and means for coupling signals from said source to the remaining input of all of said modulators.

10. The periodically varying two-port network according to claim 9 wherein said coupling means includes wave shaping means and amplitude control means.

11. In combination, a first circuit comprising a multiplying circuit having a periodically varying multiplier of fixed period; a plurality of second circuits each comprising simple passive circuit elements, an input multiplying circuit and an output multiplying circuit, said input and output multiplying circuits having periodically varying multipliers of said fixed period; a plurality of third circuits each comprising a bridge circuit of simple passive circuit elements, a pair of input multiplying circuits connected to opposite vertices of said bridge circuit and a pair of output multiplying circuits connected to the remaining vertices of said bridge circuit, said input pair and output pair of multiplying circuits both having periodically varying multipliers of said fixed period, input and output terminals, and means connecting said first, second and third circuits in parallel between said input and output terminals.

12. The combination according to claim 11 wherein said simple passive circuit elements of each said second circuit is characterized by an impulse response of the form $e^{-\alpha t}$.

13. The combination according to claim 11 wherein said bridge circuit comprises one opposite pair of simple passive circuits each characterized by an impulse response of the form $e^{-\alpha t} \sin \beta t$ and another opposite element pair of simple passive circuits each characterized by an impulse response of the form $e^{-\alpha t} \cos \beta t$.

References Cited by the Examiner

UNITED STATES PATENTS

| | | | |
|---|---|---|---|
| 2,024,900 | 12/1935 | Wrener et al. | 333—70 |
| 2,067,443 | 1/1937 | Gewerz | 333—70 |
| 2,067,444 | 1/1937 | Gewerz | 333—70 |
| 2,680,151 | 6/1954 | Boothroyd | 333—70 |
| 2,785,853 | 3/1957 | Honore | 235—193 |
| 3,009,640 | 11/1961 | Honore | 235—193 |

ARTHUR GAUSS, *Primary Examiner.*

HERMAN KARL SAALBACH, C. BARAFF, *Assistant Examiners.*